June 24, 1941.   J. H. HOUGH   2,246,849
INDICATING INSTRUMENT
Filed June 9, 1939
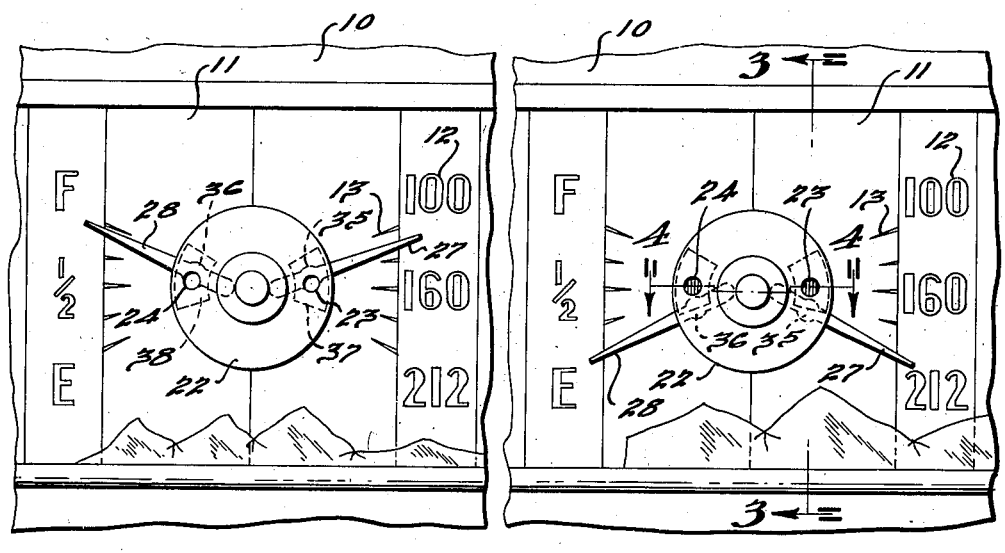
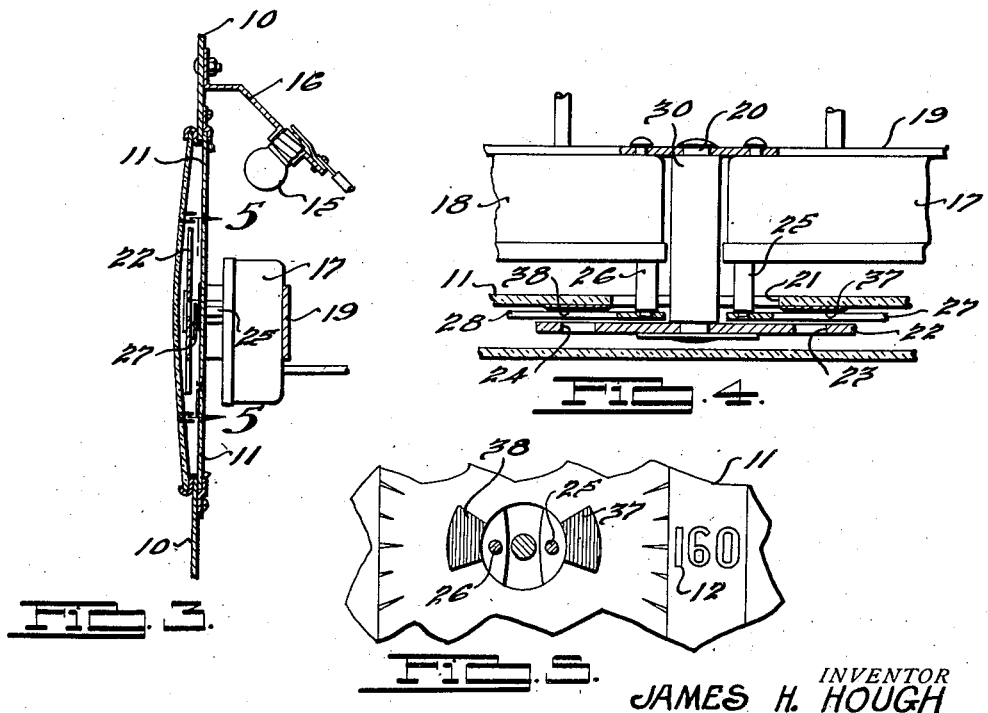
INVENTOR
JAMES H. HOUGH
BY
ATTORNEYS.

Patented June 24, 1941

2,246,849

UNITED STATES PATENT OFFICE 2,246,849

INDICATING INSTRUMENT

James H. Hough, Detroit, Mich., assignor to Chrysler Corporation, Highland Park, Mich., a corporation of Delaware Application June 9, 1939, Serial No. 278,251

10 Claims. (Cl. 116—129)

The present invention relates to visual warning indicators for instrument panels, such as the dashboard of an automobile, for the purpose of indicating the amount of fuel in a tank, engine oil pressure, the speed of the vehicle, or some other condition. The present disclosure is limited to a combined fuel indicator and engine cooling water temperature indicator, but other instruments may be formed in accordance with the present invention.

The principal object of the present invention is to provide means for flashing a visual signal when the condition indicated by the instrument approaches an alarming state, such as the fuel tank becoming empty, the speed of the vehicle becoming excessive, or the temperature of the cooling water becoming excessive.

A further object of the invention is to provide means whereby the warning signal given by the instrument is continuous as long as the condition for which warning is given exists, and which increases in intensity as the need for attention to the warning increases.

A further object of the invention is to provide means of the character previously described without seriously modifying the appearance and general structure of the ordinary instrument, whereby the invention may be easily manufactured and may become standard equipment on many different makes of automotive vehicles.

These and other objects and the advantages of the invention will be more readily apparent after a study of the following specification and the accompanying drawing wherein like numerals refer to like parts throughout.

In the drawing, Fig. 1 discloses a portion of a dashboard having a fuel indicator and a water temperature indicator mounted thereon, the indicators both showing a safe condition for the part of the vehicle to which they appertain;

Fig. 2 is a view similar to Fig. 1 showing both indicators at their extreme opposite positions with danger signals completely visible to the operator;

Fig. 3 is a vertical section taken substantially along line 3—3 of Fig. 2;

Fig. 4 is a horizontal section on an enlarged scale, taken substantially along line 4—4 of Fig. 2; and, Fig. 5 is a partial section taken along line 5—5 of Fig. 3.

In the drawing, the dashboard is indicated by the numeral 10 and is provided with an opening in which may be securely fastened the face plate 11 of the indicating instruments comprising the present invention. The face plate 11 is preferably composed of a translucent material such as glazed, clear glass so that opaque numerals 12 and graduation marks 13 painted on the face thereof will be clearly visible to the operator of the vehicle, the visibility during the daytime being effected by the reflection of outdoor light, and visibility at night being effected by the emission of light rays from an electric light 15 mounted upon a bracket 16 attached to the rear surface of the dashboard. The light 15 is preferably placed above the center of the face plate 11, in order that light may reach substantially all portions of the rear of the face plate without substantial interference from the indicating motors 17 and 18. The motors 17 and 18 are preferably rigidly attached to a bar 19 suitably supported to the rear of and parallel to the face plate 11, and a mounting post 20 positioned between the two motors extends through an opening 21 in the face plate for the purpose of supporting an opaque, or nearly opaque, shield 22 centrally of the two sets of indicating numerals. The shield 22 is provided with a pair of signal openings 23 and 24, each opening being substantially opposite the central indicating numeral of each instrument. The motors are provided with operating shafts 25 and 26, respectively, which extend forward through the opening 21 and support indicating levers or pointers 27 and 28, respectively, which are substantially parallel to the face plate 11 and shield 22 in the space therebetween. A spacer 30 may be provided to surround the mounting rod 29 and form a rigid support for the shield 22.

The levers 27 and 28 are provided with intermediate enlargements 35 and 36, respectively, which are at such distances from the shafts 25 and 26 as to transcribe arcs passing beneath the indicating openings 23 and 24, respectively. The face plate 11 is provided with a pair of colored, translucent patches 37 and 38 underlying the region of the openings 23 and 24, respectively. The patches may be provided by painting the plate or by adhering pieces of translucent material thereto, but, in either instance, the patches should be of a color such as to attract attention, preferably red. Each patch extends a slight distance below the horizontal center line of the instrument and a considerably greater distance above the horizontal center line of the instrument or in the direction toward the source of light, so that all light transmitted to the openings 23 and 24 will be of the warning color. Of course, if the light source were placed at a different position, the shape of the patches could be altered so as to cause filtered light only to reach the indicating openings.

The arcs of movement of the indicating pointers 27 and 28 are preferably limited so that the enlargements 35 and 36 cast shadows completely across the openings 23 and 24 when the safest possible conditions exist in the mechanisms to which the instruments pertain, and continue to cast shadows completely across the openings even though some movement of the levers occurs. The enlargements are preferably of such diameter with respect to the diameters of the indicating openings that a range of substantially one-half the movement of the indicating levers, or greater, is necessary before any red light is transmitted to the openings, and are yet not so great as to prevent a full uncovering of the openings slightly before the greatest possible danger occurs. Thus, in the case of a fuel gauge, the enlargement is preferably of such a size with respect to the opening 24 that a faint glow of red light appears at the opening when the fuel tank is approximately one-quarter full, and the entire opening is uncovered before the fuel tank becomes completely empty; likewise, in the case of the water temperature indicator, a faint glow of red appears in the indicating opening when the water temperature starts to rise above the temperature which should be maintained if all parts of the engine were functioning normally, and a full red disc will be disclosed slightly before the water commences to boil.

Having described and illustrated preferred embodiments of the present invention, it should be apparent to those skilled in the art that the same permits of modifications in arrangement and detail. All such modifications as come within the scope of the following claims are considered a part of my invention.

I claim:

1. An indicating instrument comprising a translucent face plate, a scale associated therewith, a movable pointer in front of said face plate and having a range of movement along said scale, a shield positioned in front of a portion of said pointer and provided with an indicating opening beneath which said portion of the pointer moves, a source of light behind said face plate and so positioned with respect to said pointer and said opening as to cast the shadow of said pointer on the back of said shield in the region of said opening during a portion of the movement of said pointer, and a translucent, colored patch between said source of light and said opening for the purpose of permitting the passage of filtered light only through said opening when said pointer moves beyond the position at which it shades said opening.

2. A danger signaling indicator for an automobile instrument panel comprising a pointer-moving motor and a pointer actuated thereby, a scale-bearing, light-transmitting face plate mounted between said motor and said pointer, a shield mounted in front of said pointer and covering a portion thereof, said shield having an opening therethrough, a source of light mounted behind said face plate in such position with respect to said pointer as to cast the shadow thereof on the back of said shield in the region of said opening during a portion of the movement thereof, and a light filter positioned between said source of light and said opening so that movement of said pointer beyond the said portion of the movement thereof permits the transmission through said opening of light having a wave length different from the wave length of light transmitted through said face plate.

3. A danger signaling indicator for an automobile instrument panel comprising a pointer-moving motor and a pointer actuated thereby, a scale-bearing, light-transmitting face plate mounted between said motor and said pointer, a shield mounted in front of said pointer and covering a portion thereof, said shield having an opening therethrough, a source of light mounted behind said face plate in such position with respect to said pointer as to cast the shadow thereof on the back of said shield in the region of said opening during a portion of the movement thereof, and a small piece of translucent, colored material positioned between said source of light and said opening so that movement of said pointer beyond the said portion of the movement thereof permits the transmission through said opening of light having a wave length different from the wave length of light transmitted through said face plate.

4. A danger signaling indicator for an automobile instrument panel comprising a pointer-moving motor and a pointer actuated thereby, a scale-bearing, light-transmitting face plate mounted between said motor and said pointer, a shield mounted in front of said pointer and covering a portion thereof, said shield having an opening therethrough, a source of light mounted behind said face plate in such position with respect to said pointer as to cast the shadow thereof on the back of said shield in the region of said opening during a portion of the movement thereof, and a patch of material capable of filtering light applied to a surface of said face plate in a small area behind said shield and in line with said source of light and said opening so that movement of said pointer beyond the said portion of the movement thereof permits the transmission through said opening of light having a wave length different from the wave length of light transmitted through said face plate.

5. A danger signaling indicator for an automobile instrument panel comprising a pointer-moving motor and a pointer actuated thereby, a scale - bearing, light - transmitting face plate mounted between said motor and said pointer, a shield mounted in front of said pointer and covering a portion thereof, said shield having an opening therethrough, a source of light mounted behind said face plate in such position with respect to said pointer as to cast the shadow thereof on the back of said shield in the region of said opening during a portion of the movement thereof, and a patch of material capable of filtering light applied to a surface of said face plate in a small area behind said shield and in line with said source of light and said opening so that movement of said pointer beyond the said portion of the movement thereof permits the transmission through said opening of light having a wave length different from the wave length of light transmitted through said face plate, said pointer being so constructed and arranged as to permit a gradually increasing warning light to become visible through said opening before the actual danger point on said scale is reached by said pointer.

6. An indicating instrument comprising a movable pointer, a shield positioned in front of a portion of said pointer and provided with an indicating opening, a source of light behind said shield and said pointer, and a light filter interposed between said source of light and said shield, said pointer being of such a width relative to the width of said opening and being so positioned as to normally prevent the passage of light from said source through said opening and to permit the passage of filtered light through said opening when approaching an extreme limit of movement.

7. An indicating instrument comprising a translucent face plate, a scale associated therewith, a movable pointer in front of said face plate and having a range of movement along said scale, a shield positioned in front of a portion of said pointer and provided with an indicating opening beneath which said portion of the pointer moves, and means having a colored surface between said shield and said scale viewable through said opening only when said pointer is in a predetermined portion of its range of movement, said opening, pointer and colored surface being so constructed and arranged as to accommodate viewing of said colored surface only when said pointer is positioned to indicate an unsatisfactory condition.

8. An indicating instrument comprising a translucent face plate, a scale associated therewith, a movable pointer in front of said face plate and having a range of movement along said scale, a shield positioned in front of a portion of said pointer and provided with an indicating opening beneath which said portion of the pointer moves, means having a colored surface between said shield and said scale viewable through said opening only when said pointer is in a predetermined portion of its range of movement, said opening, pointer and colored surface being so constructed and arranged as to accommodate viewing of said colored surface only when said pointer is positioned to indicate an unsatisfactory condition, and a light bulb for illuminating said colored surface.

9. An indicating instrument comprising a movable pointer, a shield positioned in front of a portion of said pointer and provided with an indicating opening, and a colored patch behind said shield and said pointer, said pointer being of such a width relative to the width of said opening and being so positioned as to normally prevent viewing of said colored patch through said opening and to permit viewing of said colored patch through said opening when approaching an extreme limit of movement.

10. An indicating instrument comprising a movable pointer, a shield positioned in front of said pointer and provided with an indicating opening adjacent a portion thereof, a patch of colored material at the other side of said portion of said pointer and adjacent said indicating opening, and means to illuminate said patch of colored material, said portion of said pointer being of such size and shape relative to the size and shape of said indicating opening and being so positioned with respect thereto as normally to prevent viewing of said patch through said indicating opening and to permit progressively increasing viewing of said patch through said opening as said pointer approaches a position at which attention should be attracted thereto.

JAMES H. HOUGH.